United States Patent [19]

Thompson et al.

[11] 4,237,204
[45] Dec. 2, 1980

[54] MOLYBDENUM SULFIDE CATHODE STRUCTURE

[75] Inventors: Arthur H. Thompson, New Providence; Charles R. Symon, Rahway; Allan J. Jacobson, Princeton, all of N.J.

[73] Assignee: Exxon Research & Engineering Co., Florham Park, N.J.

[21] Appl. No.: 88,828

[22] Filed: Oct. 29, 1979

[51] Int. Cl.³ .............................................. H01M 6/14
[52] U.S. Cl. .................................. 429/194; 429/191; 429/209; 429/218
[58] Field of Search ............... 429/194, 218, 191, 209

[56] References Cited

U.S. PATENT DOCUMENTS

| | | | |
|---|---|---|---|
| 2,985,701 | 5/1961 | Brennan | 136/40 |
| 3,907,589 | 9/1975 | Gay et al. | 136/6 R |
| 3,933,520 | 1/1976 | Gay et al. | 429/218 X |
| 4,145,806 | 3/1979 | San-Cheng Lai | 429/207 X |
| 4,161,569 | 7/1979 | Faber | 429/234 |

Primary Examiner—Charles F. LeFevour
Attorney, Agent, or Firm—Kenneth P. Glynn

[57] ABSTRACT

The present invention is directed to an electric current-producing cell which contains:
(a) an anode having as its anode-active material one or more metals selected from a group consisting of Periodic Table Group Ia metals, Group Ib metals, Group IIa metals and Group IIb metals;
a cathode, comprising:
  (i) metalized containment means having a plurality of apertures therein, said apertures having an average cross-sectional dimension of about 1 to about 100 microns; and
  (ii) cathode-active molybdenum sulfide contained within said metalized containment means; and
(c) an electrolyte which is chemically inert with respect to said anode and said cathode and which permits the migration of ions between said anode and said cathode.

7 Claims, 4 Drawing Figures

MOLYBDENUM SULFIDE CATHODE STRUCTURE

BACKGROUND OF THE INVENTION

1. Field of the Invention

The present invention relates to electric current producing cells, and more particularly to such cells employing improved molybdenum sulfide cathode structures.

2. Description of the Prior Art

There has been considerable interest in recent years in developing high energy density batteries for voltaic cells. Exemplary of the developing systems is a high energy density electrochemical cell utilizing intercalation compounds of the transition metal chalcogenides as cathode-active materials and using alkali metal anodes. For example, one such cell employs a lithium anode-active material in conjunction with an $MoS_x$ (where 2 is less than x which is less than 3) as its cathode-active material. Other such prior art systems include lithium anode/titanium disulfide cathode couples as well as those containing mixtures of cathode-active material.

In general, the chalcogenide cathode-active materials are formed into the desired electrode structures by being hot pressed in a Teflon mixture with a grid-like support structure. It has been recognized that the Teflon or other binder material is necessary to maintain the structural integrity of the desired electrode configuration.

Although little development work has been done with respect to cathode systems employing chalcogenide compounds without using binder materials, there has been some development in the battery art in general concerning various structural changes to electrode fabrication. For example, U.S. Pat. No. 3,907,589 illustrates an anode structure which is enclosed within an expanded mesh of molybdenum metal to act as a current collector and to insure structural integrity of the anode-active material. Also, U.S. Pat. No. 2,985,701 is directed to the use of a porous, woven dielectric support to form a pocket enclosure for electrodeactive materials and collector plates. The woven cloth is at least partially coated or lined with metallic particles. U.S. Pat. No. 4,161,569 describes a method of making a composite electrode wherein the synthetic resin layers composed of screen, net, fabric or grids of filaments, form pockets in which the active electrode mass is disclosed in contact with the metal support or grid. This pocket structure is adapted to permit volume change of the active mass while serving as a completely stable structure in the static sense. Also, U.S. Pat. No. 4,145,806 describes electrodes which may be either positive or negative, which include a current collecting wire and an active material retaining member which may be in the form of a wire cage, porous placque or wire screen.

Notwithstanding the foregoing prior art, it is believed that it has neither been taught nor rendered obvious that particular performance advantages may be achieved by employing particular structural arrangements with molybdenum sulfide cathode-active materials. Thus, is believed that the present invention is neither taught nor rendered obvious by the prior art.

SUMMARY OF THE INVENTION

The present invention is directed to an electric current-producing cell which contains:

(a) an anode having as its anode-active material one or more metals selected from a group consisting of Periodic Table Group Ia metals, Group Ib metals, Group IIa metals and Group IIb metals;

(b) a cathode comprising: (i) metalized containment means having a plurality of apertures therein, said apertures having an average cross-sectional dimension of about 1 to about 100 microns; and (ii) cathode-active molybdenum sulfide contained within said metalized containment means; and (c) an electrolyte which is chemically inert with respect to said anode and said cathode and which permits the migration of ions between said anode and said cathode.

DETAILED DESCRIPTION OF THE INVENTION

Figure 1:
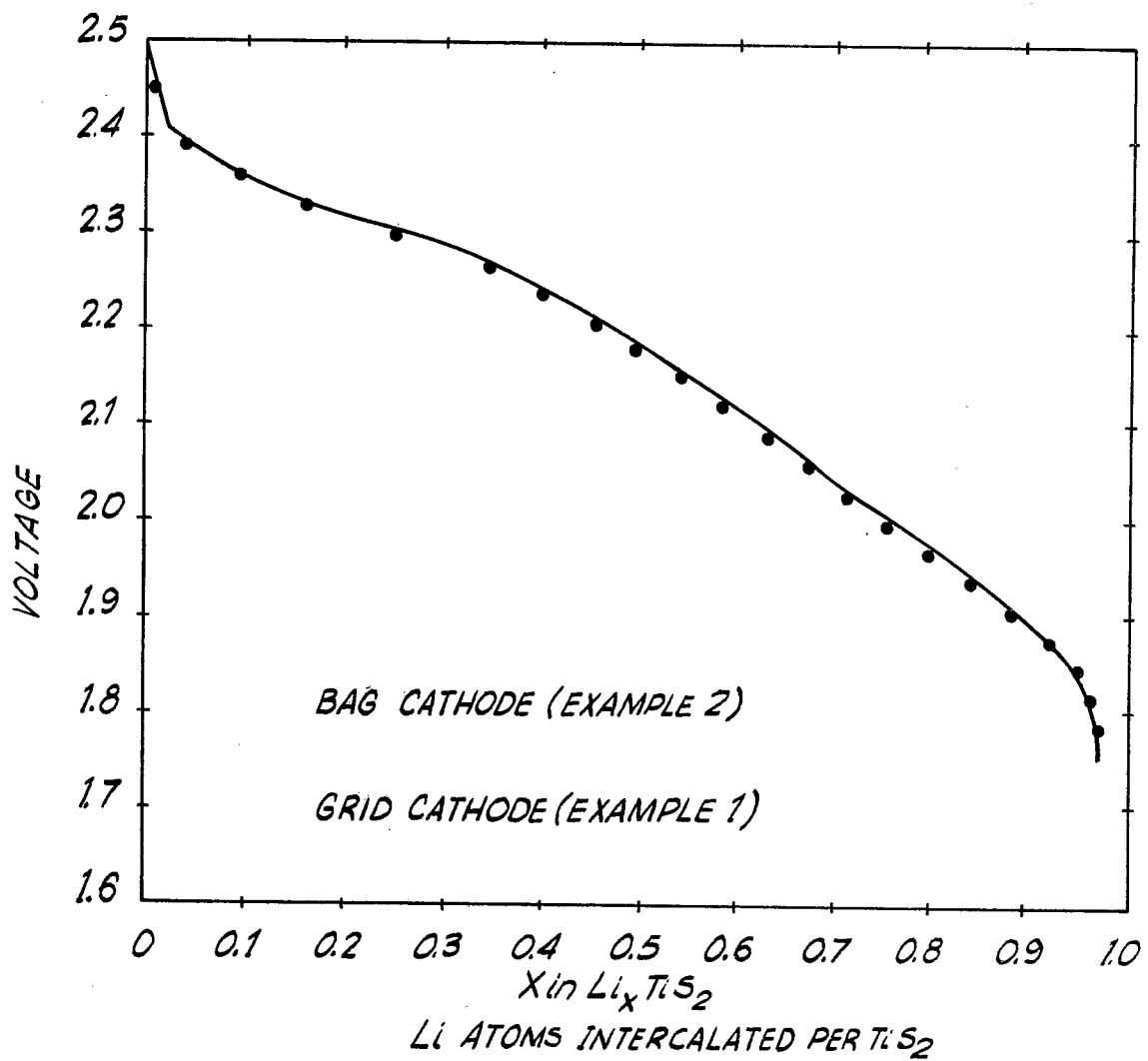
FIG. 1 illustrates voltage vs. amount of lithium atom intercalated per titanium disulfide molecule for Examples 1 and 2.

The electric current-producing cell of the present invention is one which contains a specified anode, a functional electrolyte, and a cathode including metalized containment means of predetermined specifications and cathodeactive molybdenum sulfide contained within the metalized containment means.

In general, the anode employed in the cell of the present invention is one which contains as its anode-active material one or more metals selected from the group consisting of the Periodic Table Group Ia metals, Group Ib metals, Group IIa metals and Group IIb metals. Of these, the Group Ia metals, also known as the alkali metals, are desirable. Preferred is the anode having as its anode-active material a metal selected from the group consisting of lithium and sodium, and most preferably lithium. The anode-active material may be in contact with other metal structures in the cell of the present invention, depending upon the particular anode-active material being used. Thus, for example, some anode-active materials are self-supporting and may also serve as current collectors, whereas other anode-active materials, e.g., lithium, may be in contact with other metal structures, such as nickel, copper or steel screen, which serve as current collectors. These anode configurations are a matter of design, depending upon the particular anode-active material being used and are well known in the art.

The cathode employed in the cell of the present invention is one which includes:

(i) metalized containment means having a plurality of apertures therein, said apertures having an average cross-sectional dimension of about 1 to about 100 microns; and, (ii) cathode-active molybdenum sulfide contained within the metalized containment.

The metalized containment means may be made of any metal or metalized material which will not adversely affect the electrochemical characteristics of the cell of the present invention and may be either rigid or nonrigid. Thus, perforated sheet metal may be employed to form a box-like configuration or other containment configuration, or metalized non-metalic material such as metalized plastic or carbon fiber may be employed, or, alternatively, woven metal wire may be employed. Regardless of the particular choice of material, it is important that the material contain apertures which have an average cross-sectional dimension of about 1 to about 100 microns, and preferably about 5 to about 50 microns. The apertures may be of any geometric design, i.e., square, circular or whatever, and may vary from aperture to aperture except that, if there is some variation in aperture size, it is important that all of the apertures are sufficiently small to effectively contain the particulate cathode-active molybdenum sulfide. One preferred metalized containment means is a rigid metal structure with perforations. Another preferred metalized containment means is a metal wire woven structure such as a stainless steel or copper woven structure.

The molybdenum sulfide cathode-active material employed in the cell of the present invention is any molybdenum sulfide compound which will effectively intercalate anode-active materials. Desirable are the molybdenum sulfide compounds of the formula $MoS_x$ wherein 2 is less than or equal to x which is less than or equal to 3. Preferred is the molybdenum trisulfide cathode-active material.

These molybdenum sulfide cathode-active materials may be obtained commercially or may be fabricated by recently developed techniques such as is described in U.S. Pat. No. 4,166,160 issued on Aug. 28, 1979, to Chianelli et al and incorporated herein by reference. In one preferred technique, cathode-active molybdenum sulfide precursor material such as ammonium thiomolybdate is placed within the metalized containment means and subsequently hot pressed at, for example, 250° C. to 350° C., whereby in situ formation of molybdenum trisulfide occurs. Other fabrication techniques should now be apparent to the artisan.

The electrolyte used in the cell of the present invention is any electrolyte which is chemically inert with respect to the anode and with respect to the cathode, and which permits the migration of ions between the anode and the cathode. In general, the choice of electrolyte depends upon the anode-active material being used in the cell. Thus, where the anode-active material is a Group Ia metal, the electrolyte will most likely be nonaqueous. However, where the anode-active material is one which is selected, for example, from the Group IIb metals, an aqueous electrolyte may be employed. When the preferred anode-active material selected from the Group Ia metals is used in a cell of the present invention, the electrolyte may typically be a non-aqueous alkali metal salt-organic solvent electrolyte. These alkali metal salts are well known in the art and need not be enumerated herein. However, such salts include the lithium and sodium salt complexes which are dissolved in organic solvents such as inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate cells dissolved in dioxolane or a dioxolane-containing solution. One preferred electrolyte in cells containing sodium as its anode-active material contains sodium triethyl pyrrole boron dissolved in a cyclic ether-containing solution. Alternatively, solid electrolytes, such as the beta aluminas or halides, or molten salts, may be used.

The electric-current producing cells of the present invention contained in the above-mentioned anodes, cathodes and electrolytes not only have high energy densities, but are also capable of being cycled through charging and discharging, and may be readily produced on a large-scale basis. Also, the cells of the present invention eliminate the necessity for a polymeric binder with the molybdenum sulfide cathode-active material, have efficient current collection, and exhibits superior cell capacity, both on initial discharge and on repeated cycling.

The present invention is illustrated by the following examples, but the invention should not be construed to be limited thereto.

EXAMPLE 1 AND 2 (Outside Scope Of Present Invention)

A conventionally designed test cell (Example 1) was prepared as follows:

An electrode was formed by hot pressing a mixture of 90% by weight of $TiS_2$ and 10% by weight of Teflon onto an expanded stainless steel grid. This cathode structure was surrounded with polypropylene separators and a lithium sheet and was immersed in $LiCO_4$ (2 molar) in dioxolane. The cell was discharged and voltage versus amount of lithium per $TiS_2$ molecule was plotted as shown in FIG. 1.

A second test cell (Example 2) was prepared as above, except that in place of the $TiS_2$-Teflon-metal grid electrode, a stainless steel wire bag containing $TiS_2$ without Teflon was employed. The bag was made of stainless steel wire cloth (1.5 cm by 6 cm) with a 10 micron mean cross-sectional mesh opening. This was folded and spot welded down two sides to make a rectangular bag of 1.5 cm by 3 cm. The cell was discharged and voltage versus lithium intercalation was plotted as shown in FIG. 1.

FIG. 1 shows that no performance advantage is obtained for $TiS_2$ cells by employing metal containment means in place of a grid to eliminate the need for a binder material.

EXAMPLE 3 AND 4 (Outside Scope of Present Invention)

A cell (Example 3) was prepared as in Example 1 except that 90% by weight of ammonium thiomolybdate was used in place of the $TiS_2$ and was converted to $MoS_3$ during hot pressing. Capacity in milliamp hours per gram is plotted against cycle number in FIG. 2.

Figure 2:
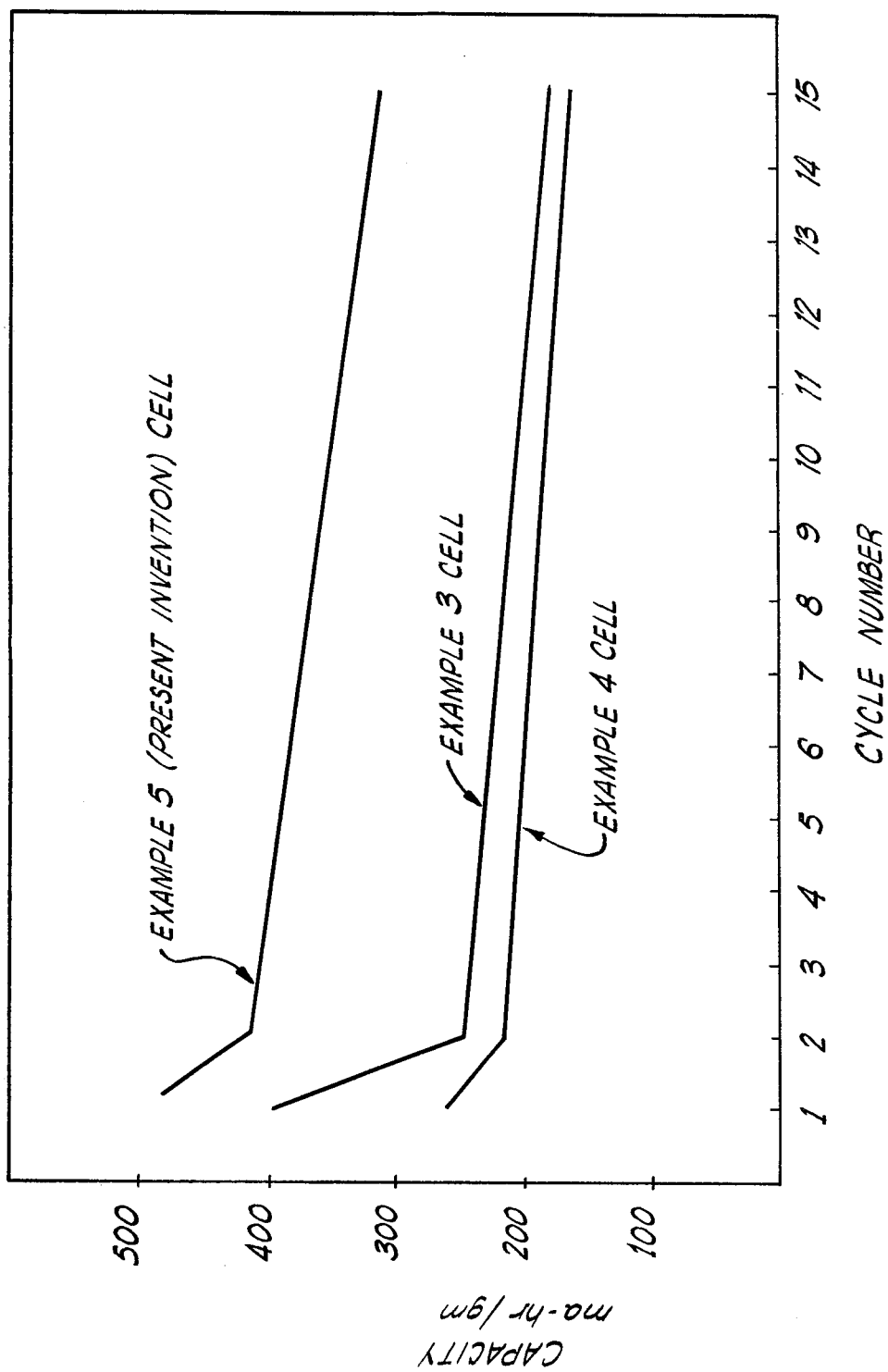
FIG. 2 illustrates capacity in milliamp hours per gram vs. cycle number for Examples 3, 4 and 5.

A second cell (Example 4) was prepared in a similar manner except that the cathode mixture comprised 60% by weight of ammonium thiomolybdate, 30% by weight of graphite and 10% by weight of Teflon. Fig. 2 illustrates capacity versus cycle number and shows that capacity is slightly enhanced by the inclusion of graphite in the cathode.

EXAMPLE 5 (Present Invention)

A cell was prepared as in Example 2 using the stainless steel mesh bag cathode, except that ammonium thiomolybdate was employed in place of $TiS_2$ and was hot pressed in the bag at 300° C. and converted to $MoS_3$. Capacity versus cycle number is illustrated in FIG. 2. As FIG. 2 reveals, considerable improvement in capacity is obtained by utilizing the "exoskeletal" metalized containment means as compared to the "endoskeletal" grid electrode with and without graphite.

Figure 3:
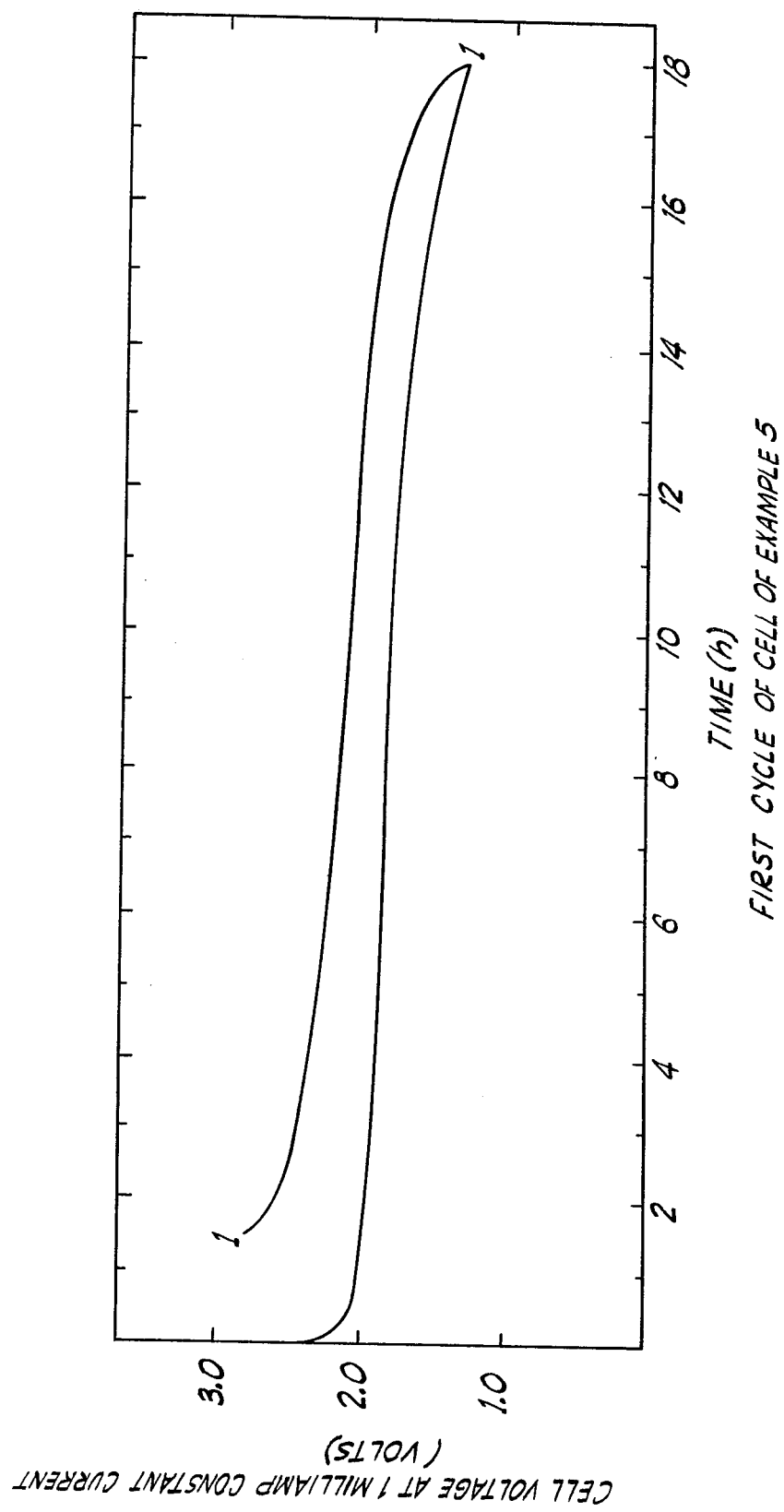
FIG. 3 illustrates cell voltage at a constant current vs. time for the first cycle of the cell of Example 5; and, FIG. 4 illustrates capacity as a percentage of the first discharge vs. cycle number for the cells of Examples Nos. 3 and 5.

To further illustrate the advantage of the present invention, cell voltage at a 1 milliamp constant current versus time for the first cycle of the cell of Example 5 is shown in FIG. 3.

EXAMPLES 6 AND 7

Figure 4:
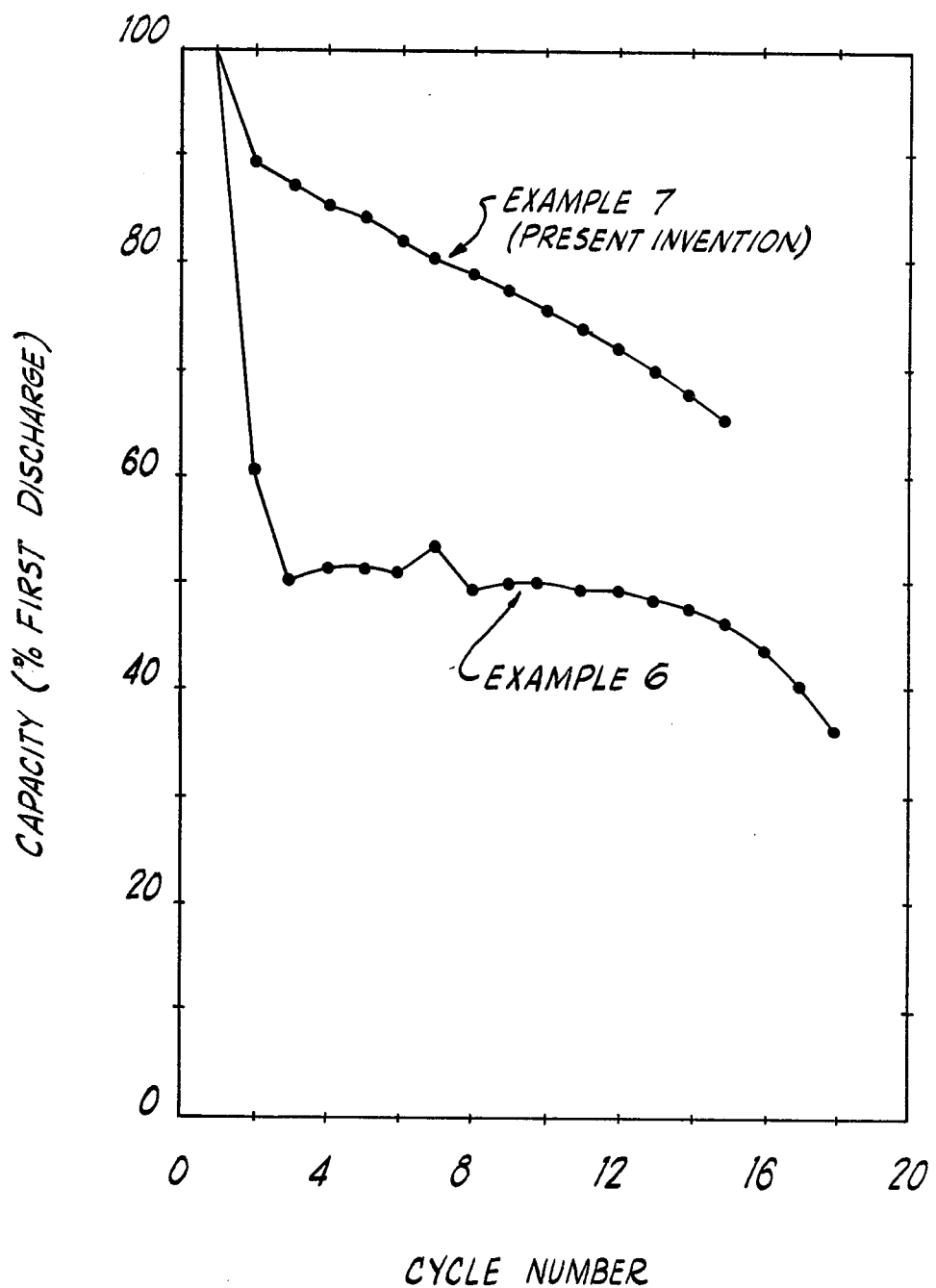

A grid cathode cell (Example 6) was prepared as in Example 3 and a metalized containment means cathode cell (Example 7) was prepared as in Example 5. Capacity as a percentage of first discharge versus cycle number is illustrated in FIG. 4. As shown, considerable advantage in capacity is achieved using the present invention cathode.

What is claimed is:

1. An electric current-producing cell, comprising:
   (a) an anode having as its anode-active material one or more metals selected from the group consisting of the Periodic Table Group Ia metals, Group Ib metals, Group IIa metals and Group IIb metals;
   (b) a cathode, comprising:
      (i) metalized containment means having a plurality of apertures therein, said apertures having an average cross-sectional dimension of about 1 to about 100 microns; and
      (ii) cathode-active molybdenum sulfide contained within said metalized containment means; and,
   (c) an electrolyte which is chemically inert with respect to said anode and said cathode and which permits the migration of ions between said anode and said cathode.

2. The cell of claim 1 wherein said anode has as its anode-active material one or more metals selected from the Group Ia metals.

3. The cell of claim 1 wherein said metalized containment means is a rigid metal structure.

4. The electrode structure of claim 1 wherein said metalized containment means is a metal wire woven structure.

5. The cell of claim 1 wherein said average cross-sectional dimension is about 5 to about 50 microns.

6. The cell of claim 1 wherein said anode-active material is lithium.

7. The cell of claim 1, 2, 3, 4, 5 or 6, wherein said molybdenum sulfide is $MoS_3$.

* * * * *